United States Patent [19]
Manzone

[11] Patent Number: 6,054,159
[45] Date of Patent: Apr. 25, 2000

[54] SELF-SUPPORTING STICK FOR CONSUMABLES AND LOLLIPOP

[76] Inventor: Cheryl Manzone, 75-44 Grand Central Pkwy, Forest Hills, N.Y. 11375

[21] Appl. No.: 09/189,246

[22] Filed: Nov. 10, 1998

[51] Int. Cl.[7] .................................................. A23G 3/02
[52] U.S. Cl. ........................... 426/134; 426/91; 426/104; 294/5.5; 294/1.1; 248/539; D1/105
[58] Field of Search .............................. 426/134, 91, 104; 294/1.1, 5.5; 248/539; D1/105

[56] References Cited

U.S. PATENT DOCUMENTS

| | | |
|---|---|---|
| D. 313,107 | 12/1990 | Maddock . |
| D. 334,273 | 3/1993 | Kupperman . |
| 1,867,945 | 7/1932 | Hunter . |
| 2,151,282 | 3/1939 | Stamp . |
| 2,211,197 | 8/1940 | Cahoon . |
| 2,462,991 | 3/1949 | Palinkas . |
| 2,651,130 | 9/1953 | Stratmann . |
| 3,968,262 | 7/1976 | Hodska . |

*Primary Examiner*—Steven Weinstein
*Attorney, Agent, or Firm*—Anthony J. Casella; Gerald E. Hespos

[57] ABSTRACT

A lollipop stick and a lollipop are provided with an expandable support for supporting a lollipop stick and the lollipop in an erect orientation. The support may be formed by a plurality of slits in the bottom end of the lollipop stick so that a plurality of deflectable legs are formed between each pair of slits. The legs may be rotated away from one another to form a tripod or other such support. Thus, the lollipop can be supported in an erect condition after the initial opening of the lollipop, but prior to complete consumption. The support may be configured to present indicia, such as a logo, when support is in the condition for holding the lollipop in the erect orientation.

20 Claims, 4 Drawing Sheets

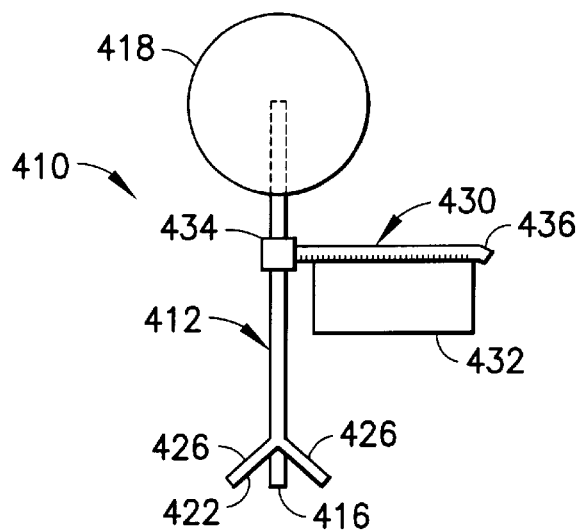
FIG.9
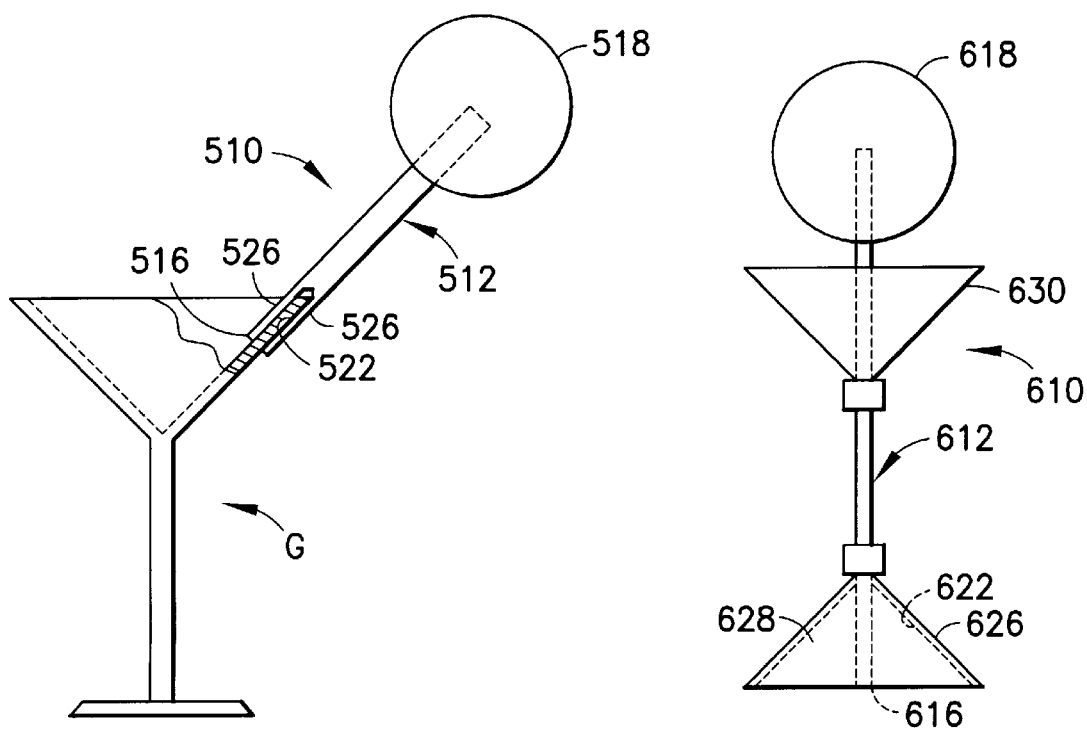
FIG.10
FIG.11

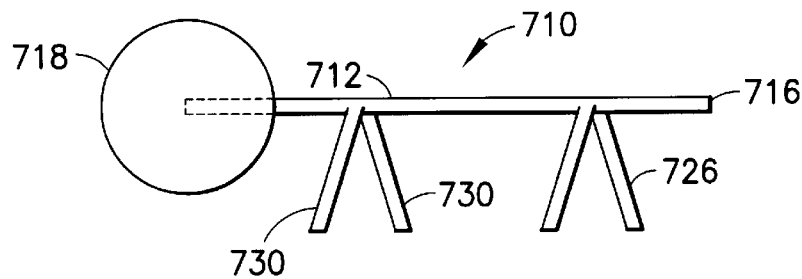
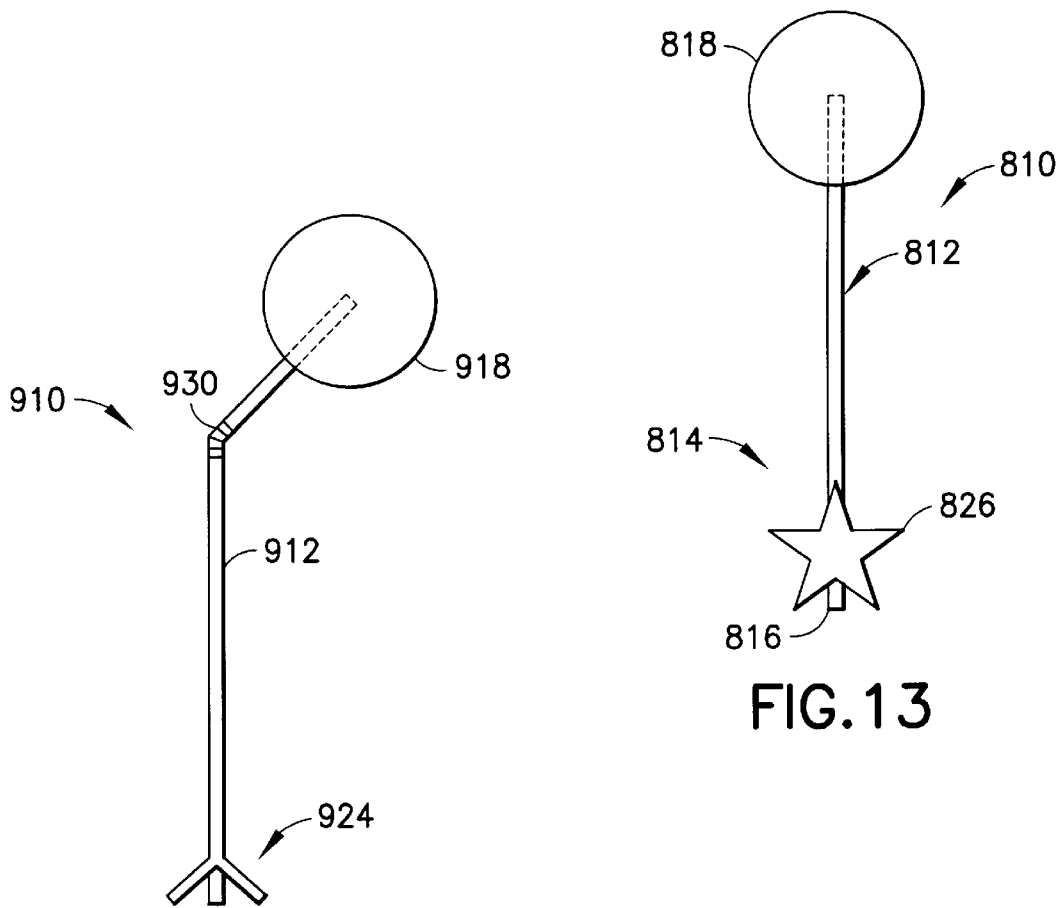

SELF-SUPPORTING STICK FOR CONSUMABLES AND LOLLIPOP

BACKGROUND OF THE INVENTION

1. Field of the Invention

The subject invention relates to sticks for consumables that enable the stick and consumable product secured thereto to be stood erect on a supporting surface.

2. Description of the Prior Art

Lollipops comprise a stick having opposed longitudinal ends and a mass of candy molded around one end of the stick. The stick typically is formed from a tightly wound paper material, wood or a laminate which may include a resin core and an outer layer of paper. The typical prior art lollipop stick defines a diameter of between one-eighth and one-quarter inch.

Prior art lollipops primary are a candy treat consumed by children. However, the candy portion of a lollipop could be the vehicle for delivering a medication, such as a cough suppressant, an appetite suppressant or a nicotine substitute. Some such medications currently are deliverable by small lozenges that a consumer will suck upon until completely dissolved. Lozenges are somewhat inconvenient for an adult at a work place, because the presence of a lozenge in a person's mouth impedes the ability of the person to enunciate clearly. A very large proportion of employed adults spend a major part of their work day speaking on a telephone or speaking into a tape recorder. Thus, lozenges become an inconvenience and impede the ability of the person to communicate verbally each time the phone rings or each time a need arises for dictating a memorandum. Of course, a hard candy can be discarded when the person needs to speak. Most hard candies are inexpensive, and hence a high turnover and replacement of such candy does not create a significant cost. However, medicated lozenges are more costly. Furthermore, the frequent discard of medicated lozenges creates difficulties in monitoring dosages.

Lollipops can be removed conveniently from a person's mouth and replaced after a short period of time. Thus, a lollipop enables an adult to conveniently switch between speaking clearly and consuming the conventional or medicated confectionery product molded onto the end of the lollipop stick. Thus, it is unnecessary for the consumer to discard the confectionery product each time a need arises to communicate verbally, and the dosage of any medication products incorporated into the confectionery portion of the lollipop can be monitored accurately.

Lollipops, however, create temporary storage problems when they are not actively being consumed. For example, an adult cannot conveniently hold a lollipop through a lengthy telephone conversation, particularly a business conversation which requires a frequent jotting of notes. A lollipop can be placed on a piece of paper to prevent the candied part of the lollipop from sticking to and soiling a tabletop, counter or desk. However, after a very short time, the candy and paper will stick to one another and portions of the paper will remain adhered to the candy. Lollipop wrappers are formed from a coated material that will not adhere to the candy. Hence, it is possible to save the lollipop wrapper for the temporary storage of the lollipop before it has been completely consumed. This, however, requires the consumer to remember to save the wrapper and then to actually keep the unattractive sticky wrapper in a convenient and typically visually obtrusive location. Hence, the sticky wrapper is likely to adhere to and damage other nearby objects. A small dish is a convenient and useful receptacle for a lollipop. However, the dish soon will be candy coated, and will require frequent cleaning to avoid contamination of a lollipop placed therein and to avoid attracting insects. The cleaning of candy lollipop residue from a dish is difficult.

All of the preceding discussion relates to problems encountered by adults who might otherwise consume a lollipop. Similar storage problems however, are encountered by children. Small children frequently will not completely consume a lollipop without interruption. Children, however, typically are less concerned about sanitary and clean storage of lollipops that have not been consumed completely. Thus, a child often will place a partly consumed lollipop on an unclean surface and will resume consumption some time later. A candy residue will remain on the surface and will create an unsightly and unsanitary condition.

The wrappers or packaging for most candy products are imprinted with trademark information to identify a particular brand. Some candies have their wrappers or packages imprinted with specialty messages that enable the candy to be distributed for promotional purposes. Additionally, some candies are molded or embossed with trademark information. In all of these instances, however, the trademark information and/or any promotional message will be discarded before the candy is consumed. This differs from many consumer products where trademark information is prominently displayed on the product for a considerable time. A candy product with an ability to display trademark information, promotional materials or other written or graphic information for a relatively long time would satisfy a market need.

All of the above-described problems have related to prior art lollipops having a stick and a confectionery candy product molded to one end of the stick. Comparable problems, however, exist with respect to other food products that are or can be mounted on a stick. For example, many hors d'oeuvres are mounted on a skewer or toothpick. Guests at cocktail parties are familiar with the difficulties of simultaneously manipulating hors d'oeuvres, a napkin and a drink. These difficulties are compounded if a need arises to shake someone's hand while manipulating a drink and an hors d'oeuvre.

SUMMARY OF THE INVENTION

The subject invention is directed to a stick for a confectionery product, and for a confectionery product, such as a lollipop, mounted on a stick. The stick of the subject invention includes opposed first and second ends. The confectionery product is molded or otherwise secured directly onto and around the first end of the stick.

The second end of the stick defines a support for standing the stick and the confectionery product in an upright orientation. The support may comprise portions of the stick adjacent the second end that are movable relative to remaining portions of the stick. For example, the second end of the stick may include a plurality of cuts to define a plurality of legs extending a short distance from the second end of the stick. The legs may be articulated away from one another by the consumer to effectively create a tripod or other such support at the second end of the stick. Thus, the consumer may separate the legs prior to or shortly after opening the lollipop and may support the lollipop on the legs for relatively short periods of storage prior to complete consumption of a confectionery product on the first end of the lollipop stick.

The support may be configured to convey indicia. For example, the supports may be dimensioned and configured to form a letter when the legs or other components of the support are articulated into their supporting orientation. Additionally, the legs may define or create a substantially planar sheet that may be usable for conveying indicia. For example, the second end of the stick may include structure similar to an umbrella, which, in a closed condition, is substantially cylindrical. However, the umbrella-like structure at the second end of the stick may be opened to provide a wide support having a generally conical surface on which indicia can be presented. The indicia will be conveyed while the lollipop is being consumed and while the lollipop is being stored prior to complete consumption. This duration of displaying the indicia is considerably longer than the duration of displaying indicia on a candy wrapper or the duration of displaying indicia on a candy wrapper or the duration of displaying indicia that has been molded into the candy itself. Thus, a much longer period of consumer exposure will exist for purposes of reinforcing brand recognition or a particular promotional message.

The indicia can be presented on a structure that is entirely separate from the supporting structure at the second end of the stick. However, the supporting structure at the second end of the stick can be used to hold the stick and any food product on the second end of the stick in an orientation that properly presents the indicia. For example, the stick may include a through slot at a location between the food product and the second end of the stick. The slot may be dimensioned to receive a card, such as a business card or a name card to identify seating locations at a social function. Alternatively, the stick can be provided with a leg projecting orthogonally away from the stick at a location between the food product and the second end of the stick. For example, a structure similar to a wire wrap can be securely mounted to an intermediate location on the stick, such that the free end of the wire wrap projects orthogonally from the stick. An indicia-bearing card can be affixed to this projection from the stick.

In other embodiments, the support can be configured for supporting the stick in a manner other than the vertically erect on a planar surface. For example, one of the slits in the stick may be sufficiently long to permit the stick to be mounted on the rim of a glass. Alternatively, a plurality of arrays of supports can be provided for supporting the stick substantially horizontally above a planar support surface, with the candy or other food product spaced from the horizontal supporting surface.

BRIEF DESCRIPTION OF THE DRAWINGS

FIGS. 8–14 are front elevational views of fourth through tenth embodiments respectively.

DETAILED DESCRIPTION OF THE PREFERRED EMBODIMENTS

Figure 1:
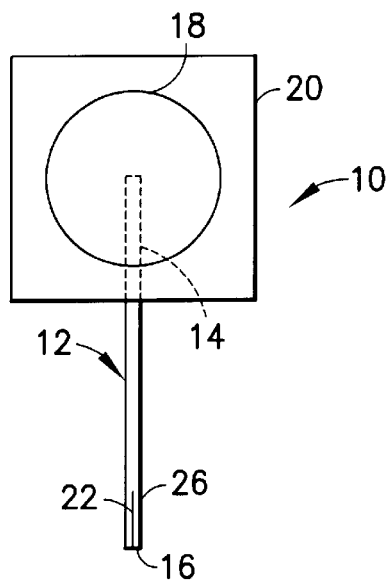
FIG. 1 is a front elevational view of a lollipop in an as-purchased condition.
Figure 2:
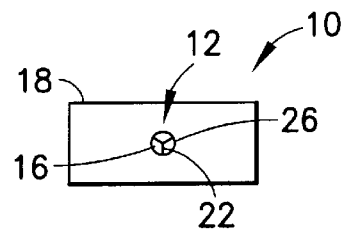
FIG. 2. is a bottom plan view of the lollipop shown in FIG. 1.

A lollipop, in an as purchased condition is identified generally by the numeral 10 in FIGS. 1 and 2. The lollipop 10 includes a stick 12 having a top end 14 and a bottom end 16. A consumable product 18 is secured to the top end 14 of the stick 12. The consumable product 18 may be a confectionery and include a medicant, such as a cough suppressant, an appetite suppressant or a nicotine substitute. Alternatively, the consumable product 18 may be an hors d'oeuvre such as a meatball, a shrimp or a dumpling. Still further, the consumable product may be a desert, such as a cookie or piece of fruit. In the embodiment shown in FIGS. 1 and 2, the consumable product 18 is depicted as a confectionery, such as a candy confectionery that comprises the consumable portion of a lollipop. A wrapper 20 surrounds and envelopes the confectionery 18 and portions of the stick 12 adjacent thereto.

As illustrated in FIG. 1, the lollipop 10 substantially resembles a conventional prior art lollipop. However, the stick 12 is formed to include a plurality of slits 22 extending upwardly distance "a" from the bottom end 16. The length of the respective slits 22 will vary depending upon the particular material from which the stick 12 is formed. In a typical embodiment, each slit 22 will define a length "a" of approximately 0.3–0.4 inch.

Figure 3:
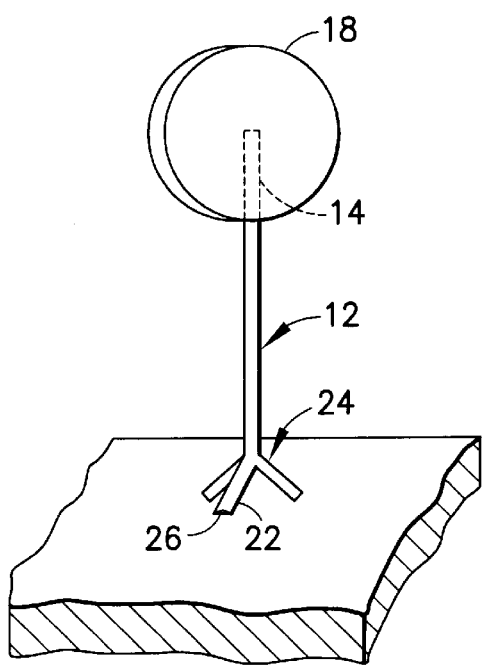
FIG. 3 is a perspective view of the lollipop supported in an erect orientation on a horizontal surface.

The slits 22 enable the end 16 of the stick 12 to be converted into a support, which is identified generally by the numeral 24 in FIG. 3. The support 24 is effectively a tripod having three legs 26 which are substantially symmetrically arrayed around the stick 12. The legs 26 can be placed in the orientation of FIGS. 3–5 merely by engaging the extreme bottom end 16 of the stick 12 with a finger nail and rotating respective legs 26 outwardly. The inherent structural characteristics of the stick 12 will provide a sufficiently stiff articulated connection between each leg 26 and remaining portions of the stick 12 to enable the legs 26 to efficiently support the lollipop in the erect condition shown in FIG. 3.

Figure 4:
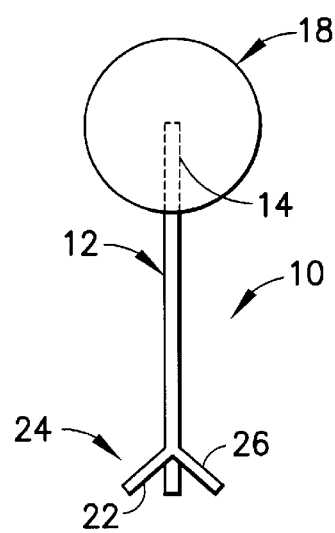
FIG. 4 is a front elevational view similar to FIG. 1, but showing the support legs rotated away from one another and into a supporting orientation.
Figure 5:
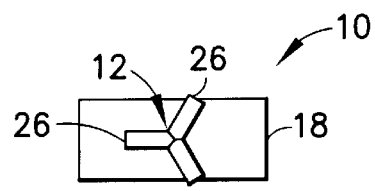
FIG. 5 is a bottom plan view of the lollipop shown in FIG. 4.

The support for the lollipop may takes forms other than those shown in FIGS. 3–5. In particular, and with reference to FIG. 6, a lollipop 110 may be provided with a stick 112 having a bottom end and a plurality of slits 122 between a corresponding plurality of legs 126. Additionally the bottom end 116 includes a skirt 128 that extends between the respective legs 126. The skirt 128 may be drawn from folded paper connected to respective legs 126 that is unfolded as the legs 126 are rotated away from one another. For this embodiment, the skirt 128 and legs 126 may comprise portions of a cocktail umbrella that often is used with skewered fruit in a mixed drink. In the prior art, however, the center of the umbrella was affixed to the top end of a stick, and the umbrella opened downwardly over the upper portion of the stick. In this embodiment, the center of the skirt 128, which may be the fabric or paper portion of the umbrella, is affixed to a bottom portion of a stick, the legs 126, which may be the ribs of a prior art umbrella, project downwardly. The skirt 128 may be imprinted with any desired indicia, such as the standard R to indicate a medicinal candy. Alternatively, the indicia on the skirt 128 may carry a trademark or a promotional message.

Figures 6, 7:
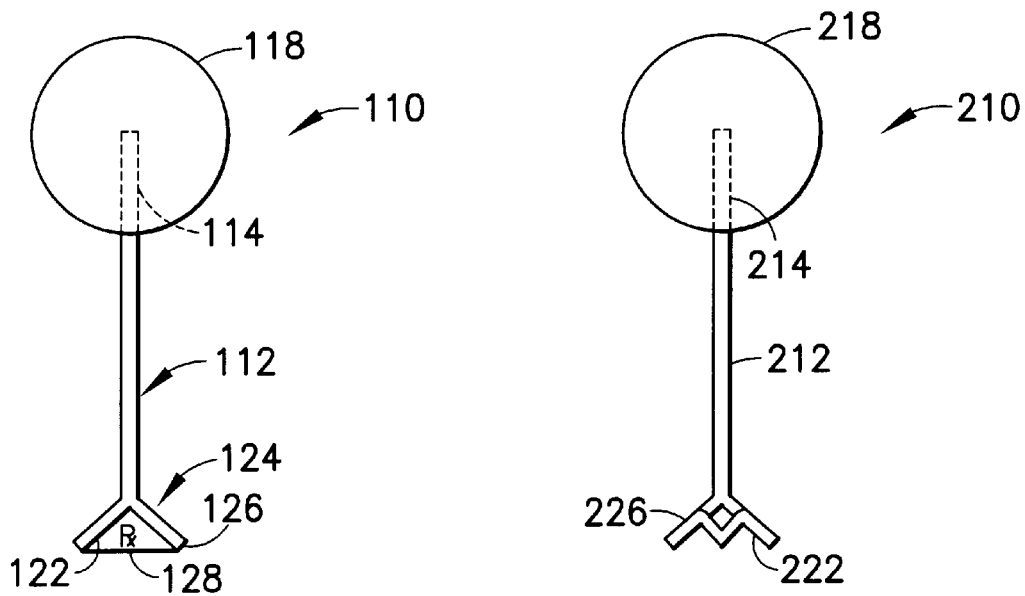
FIG. 6 is a front elevational view similar to FIG. 3, but showing a second embodiment.
FIG. 7 is a front elevational view similar to FIG. 5, but showing a third embodiment.

FIG. 7 shows a lollipop 210 having a stick 212 with a bottom end 216 and a consumable product 218 connected to the opposed end. Slits 222 are configured to form legs 226 which define a specified letter or logo. For example, as shown in FIG. 7, pairs of adjacent legs are interconnected at an intermediate location to form a letter M. Portions of the legs 226 may be colored differently from remaining portions of the stick 212 to further accent a letter or logo. Letters other than M, as well as other designs, can be formed readily by appropriately configured cuts in the bottom end of the lollipop stick.

Figure 8:
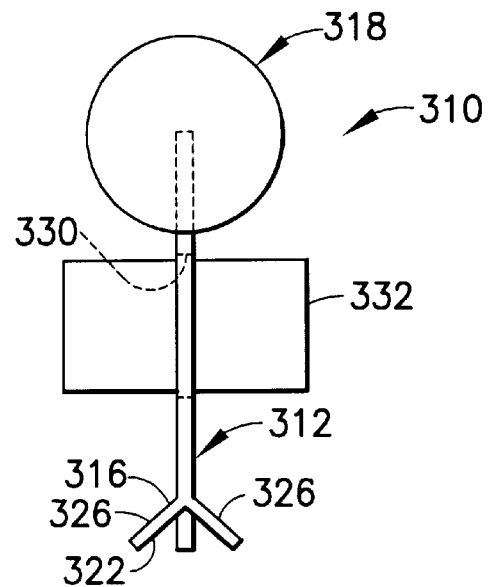

The ability to stand a lollipop erect, as shown and illustrated above, enables other desirable options. For example, as shown in FIG. 8, a lollipop 310 is provided with a stick 312 having a bottom end 316 and a consumable product 318 at the opposed end. Slits 322 extend upwardly from the bottom end 316 to form legs 326 that can support the lollipop 310 as explained above. The stick 312 further includes a slot 330 extending entirely therethrough at a location between the legs 326 and the candy 318 or other consumable product. The slot 330 frictionally retains a name card or business card identified generally by the numeral 332. Thus, the lollipop 310 can be distributed as a promotional item, and the name card or business card 332 in the slot 330 may be removed from the stick 312 and retained by the recipient of the lollipop 310. The lollipop 310 may be distributed as a favor at a social function, and may be displayed initially in its erect condition, with indicia on the card 332 relating to a theme or sponsor for the social function. Alternatively, the name tag 332 may identify the name of the intended recipient, and the lollipop 310 may be employed to indicate a seating arrangement at a social function.

A variation of the FIG. 8 embodiment is depicted in FIG. 9, and shows a lollipop 410 having a stick 412. A support 430 projects transversely from the stick 412 and is appropriately dimensioned for receiving a name card 432. The support 430 may be a conventional wire wrap with an end 434 defining a locking aperture. The opposed end 436 may be passed through the locking aperture 434, and ratchet teeth between the opposed ends may be lockingly engaged with structure on the locking aperture 434. Thus, the wire wrap defining the support 430 may be tightly wrapped around the lollipop stick 412 so that major portions of the support 430 extend transversely to the stick 412. The card 432 then may be affixed to the support 430.

The lollipop stick need not be supported on a horizontal surface. For example, FIG. 10 shows a lollipop 510 having a stick 512 with a bottom end 516 and with a consumable product 518 at the opposed end of the stick 512. The bottom end 516 of the stick 512 is formed with at least one slit 522 configured to form legs 526. The slit 522 may be appropriately dimensioned to support the lollipop 510 on the rim of a glass "G". This embodiment may be used with a stick having a slot as depicted in FIG. 8 above or with a support as depicted in FIG. 9 above. Thus, a card may be supported along the length of the stick 512. The card can display a promotional message or may identify the beverage in the glass.

A vertically supported stick carrying a food product on its upper end is likely to generate drips or crumbs. This generation of drips or crumbs can occur while the food product is being held or while the food product is being stored in its vertically oriented condition. FIG. 11 shows an alternate embodiment that prevents drips or crumbs from falling onto the hand of a person holding the stick or to prevent drips or crumbs from falling onto a surface on which the stick is supported. More particularly, FIG. 11 shows a lollipop 610 having a stick 612 with a bottom end 616 and a consumable food product 618 secured to the opposed end of the stick 612. The bottom end 616 includes a plurality of slits 622 and a plurality of legs 626 between the slits 622. As illustrated, a skirt 628 extends between the legs 626. Thus, as explained above, the bottom end 616 of the lollipop 610 may include a version of a prior art cocktail umbrella. The lollipop 610 differs from the lollipop 110 described above and illustrated in FIG. 6 in that the lollipop 610 includes a second umbrella identified generally by the numeral 630. The second umbrella 630 is affixed to a location on the stick 612 between the bottom end 616 and the consumable product 618. The second umbrella 630 opens upwardly, and functions as a receptacle for catching and retaining crumbs or drips that may fall from the food product 618.

As noted above, a primary object of the subject invention is to support the food product at a location spaced from a supporting surface or object. In the preceding embodiments, the stick that carries the food product has been vertically aligned relative to a horizontal support surface. FIG. 12 shows a lollipop 710 having a stick 712 with a bottom end 716. A food product 718, such as candy, is affixed to the top end of the stick 712. A plurality of slits 722 are disposed at selected locations along the length of the stick 712 to form a plurality of legs. Unlike the previous embodiments, the legs are not all disposed at the bottom end 716 of the stick 712. Rather, a first plurality of legs 726 are disposed adjacent the bottom end of the stick 716, and a second plurality of legs 726 are disposed closer to the food product 718. Thus, in this embodiment, the stick can be supported in horizontally spaced relationship to a supporting surface. This enables the entire lollipop 710 to resemble an animal, with the food product 718 being the head of the animal, the stick 712 being the body of the animal and the legs 726 and 730 being the legs of the animal.

In the preceding embodiments, the supports articulated to the bottom end of the stick have been substantially linear legs, and in most embodiments, the depicted legs have been unitarily formed with remaining portions of the stick. However, the support for the stick need not be a plurality of linear members, and need not be unitary. For example, the umbrella referred to in describing the embodiments of FIGS. 6 and 11 typically would not be unitary with remaining portions of the stick, but would be telescoped over the stick. FIG. 13 shows an embodiment where the supports are neither linear nor umbrella-like. In particular, FIG. 13 shows a lollipop 810 having a stick 812 with a bottom end 816 and a food product 818 secured to the other end of the stick 812. A support 814 is secured to the bottom end 816 of the stick 812. The support 814 comprises planar support members 826 that can be folded relative to one another and relative to a stick 812. Thus, the planar support members can be rotated from a relatively compressed and unobtrusive condition into a widely spread condition for supporting to the lollipop 810. The supports can take any desired shape, such as the star-shape shown in FIG. 13, or many other shapes, such as a Christmas tree.

In all prior embodiments, the stick has been depicted as being linear at locations spaced from the legs. However, the stick may be deformable. For example, as shown in FIG. 14, the lollipop 910 includes a stick 912 with a support 924 adjacent a bottom end 916 of the stick 912 and a consumable product 918 at the opposed end. A portion 930 of the stick 912 between the ends may be deformable. The deformability may be attributable to an array of corrugations, to a thinning of the stick or to a slot formed through the stick. The deformation of the stick enables the lollipop to be configured to an aesthetically attractive shape for a particular presentation and further contributes to safety of the stick.

While the invention has been described with respect to certain preferred embodiments, it is apparent that various changes can be made without departing from the scope of the invention as defined by the appended claims. For example, most of the illustrated embodiments depict a disk-shaped candy. However, candies of many other shapes may be affixed to the lollipop stick. Additionally, as noted above, other consumable products, such as hors d'oeuvres, cookies, fruit and the like could be mounted to the top end of the stick. Additionally, any form of indicia may be provided directly on the stick for conveying an appropriate message. Still further, all of the embodiments illustrate a linear stick. However, the stick can take other shapes. These and other variations will be apparent to a person skilled in the art after having read the subject disclosure.

What is claimed is:

1. A lollipop stick having a top end and an opposed bottom end, the top end being configured for supporting and retaining a consumable product thereon, the bottom end including a plurality of slits defining a plurality of legs between the slits, the legs being movable from a first condition where the legs are substantially collapsed on one another and a second condition where the legs extend angularly outwardly from remaining portions of the stick to define a support for supporting the lollipop stick and the consumable product on a supporting surface in a condition such that the top end of the stick and the consumable product will be supported spaced from the surface on which the legs rest.

2. The lollipop stick of claim 1, wherein the bottom end of the stick includes three slits extending from an outer position on said lollipop stick toward the longitudinal axis of the lollipop stick such that three legs are defined by said slits, said legs being selectively movable outwardly relative to remaining portions of said lollipop stick for defining a tripod.

3. The lollipop stick of claim 1, further comprising a collapsed skirt connected to the respective legs, the skirt being expandable in response to the hinged movement of the legs outwardly and into the supporting orientation.

4. The lollipop stick of claim 3, wherein the skirt is provided with indicia disposed thereon.

5. The lollipop stick of claim 3, wherein the skirt and the legs are formed from a first color, and wherein remaining portions of said lollipop stick are formed from a second color which is different than said first color.

6. The lollipop stick of claim 3, wherein the legs and skirt define a downwardly concave umbrella in proximity to the bottom end of the stick, and wherein the lollipop stick further includes a second upwardly concave umbrella between the ends of the stick, the upwardly concave umbrella being operative to catch debris dropped from a consumable product secured to the top end of the stick.

7. The lollipop stick of claim 1, wherein portions of the respective legs are interconnected to one another at intermediate locations such that said legs define a selected symbol when rotated into said second condition.

8. The lollipop stick of claim 7, wherein the symbol is an alphabetical letter.

9. The lollipop stick of claim 1, wherein the stick includes a plurality of arrays of legs at spaced apart locations on the stick for supporting the stick and the consumable product substantially parallel to a horizontal support surface.

10. The lollipop stick of claim 1, wherein portions of the legs are substantially planar.

11. The lollipop stick of claim 1, further comprising a slot extending through said stick at a location between said top end and said legs, said slot being dimensioned for slidably receiving a planar card therein.

12. The lollipop stick of claim 1, further comprising a support extending transversely from said lollipop stick at a location between said top and bottom ends.

13. A lollipop comprising a lollipop stick having opposed first and second ends, a consumable product being secured to said first end of said lollipop stick, said second end of said lollipop stick including a plurality of slits defining a plurality of legs, said legs being disposed in a first condition where said legs are substantially adjacent one another, said legs define portions of said cylindrical outer surface of said lollipop stick, said legs further being movable to a second condition wherein portions of said legs extend away from one another to define a support for supporting said lollipop stick and said consumable product in a selected orientation on a supporting surface, such that the consumable product on the first end of the lollipop stick is spaced from the supporting surface on which the legs rest.

14. The lollipop of claim 13, wherein the second end of said lollipop stick includes three slits for defining three legs, said legs being movable to form a tripod in said second condition of said legs.

15. The lollipop of claim 13, further comprising a collapsed skirt connected to the respective legs, the skirt being expandable in response to the hinged movement of the legs outwardly and into the supporting orientation.

16. The lollipop of claim 15, wherein the skirt is provided with indicia disposed thereon.

17. The lollipop of claim 15, further comprising an upwardly opening umbrella between the skirt and the consumable product.

18. The lollipop of claim 13, wherein portions of the respective legs are interconnected to one another at intermediate locations such that said legs define a selected symbol when rotated into said second condition.

19. The lollipop of claim 13, wherein the symbol is an alphabetical letter.

20. The lollipop of claim 13, wherein portions of said legs are substantially planar.

* * * * *